United States Patent
Jüngling et al.

(10) Patent No.: US 6,518,379 B1
(45) Date of Patent: Feb. 11, 2003

(54) METHOD OF PRODUCING RUBBER COMPOSITIONS IN STYRENE SOLUTIONS WITH STERICALLY SUPERIOR CHELATE CATALYSTS

(75) Inventors: Stephan Jüngling, Mannheim (DE); Christian Schade, Ludwigshafen (DE); Hermann Gausepohl, Mutterstadt (DE); Volker Warzelhan, Weisenheim (DE); Rainer Moors, Germersheim (DE); Hansjörg Schäch, Böhl-Iggelheim (DE); Joachim Queisser, Mannheim (DE); Gerrit Luinstra, Constance (DE); Jürgen Demeter, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/979,004

(22) PCT Filed: May 11, 2000

(86) PCT No.: PCT/EP00/04275

§ 371 (c)(1),
(2), (4) Date: Nov. 14, 2001

(87) PCT Pub. No.: WO00/71593

PCT Pub. Date: Nov. 30, 2000

(30) Foreign Application Priority Data

May 21, 1999 (DE) ......................................... 199 23 579
Apr. 18, 2000 (DE) ......................................... 100 19 111

(51) Int. Cl.$^7$ ................................................. C08J 4/06

(52) U.S. Cl. ...................... 526/172; 526/134; 526/148; 526/153; 526/159; 526/161; 526/169; 526/169.2; 526/335; 526/340.2; 525/53; 525/268; 525/315; 525/316; 525/942

(58) Field of Search .......................... 525/53, 315, 316, 525/942, 268; 526/131, 151, 159, 148, 169, 169.2, 172, 134, 161, 153, 335, 340.2

(56) References Cited

U.S. PATENT DOCUMENTS

| | | | |
|---|---|---|---|
| 3,299,178 A | | 1/1967 | Short et al. |
| 3,573,249 A | | 3/1971 | Henderson et al. |
| 5,096,970 A | * | 3/1992 | Hattori et al. .......... 526/157 X |

FOREIGN PATENT DOCUMENTS

| | | |
|---|---|---|
| DE | 198 32442 | 1/2000 |
| WO | 98/07765 | 2/1998 |
| WO | 98/07766 | 2/1998 |

OTHER PUBLICATIONS

Chem.Abst. JP 47033178; XP–002146665.

* cited by examiner

*Primary Examiner*—Fred Teskin
(74) *Attorney, Agent, or Firm*—Keil & Weinkauf

(57) ABSTRACT

In a process for polymerizing dienes in a solvent comprising vinylaromatic monomers, the polymerization is carried out in the presence of a metal compound of Ti, Zr, Hf, V, Nb, Ta, Cr, Mo or W as catalyst and a Lewis acid as cocatalyst and, if desired, an alkylating agent and, if desired, a regulator. This process can be used for preparing high-impact polystyrene, acrylonitrile-butadiene-styrene copolymers or methyl methacrylate-butadiene-styrene copolymers.

14 Claims, No Drawings

METHOD OF PRODUCING RUBBER COMPOSITIONS IN STYRENE SOLUTIONS WITH STERICALLY SUPERIOR CHELATE CATALYSTS

The present invention relates to a process for polymerizing dienes in a solvent comprising vinylaromatic monomers and to a process for preparing high-impact polystyrene, acrylonitrile-butadiene-styrene copolymers or methyl methacrylate-butadiene-styrene copolymers.

Various continuous and batchwise, solution or suspension processes are known for preparing high-impact polystyrene. In these processes, a rubber, usually polybutadiene, is dissolved in monomeric styrene which has been polymerized in a prereaction to a conversion of about 30%. The formation of polystyrene and the simultaneous decrease in the concentration of monomeric styrene results in a change in the phase coherence. During this event, known as "phase inversion", grafting reactions occur on the polybutadiene, and these together with the intensity of stirring and the viscosity influence the nature of the dispersed soft phase. In the subsequent main polymerization, the polystyrene matrix is built up. Such processes carried out in various types of reactor are described, for example, in A. Echte, Handbuch der technischen Polymerchemie, VCH Verlagsgesellschaft Weinheim 1993, pages 484–89 and in U.S. Pat. Nos. 2,727,884 and 3,903,202.

In these processes, the separately prepared rubber has to be laboriously broken up and dissolved and the resulting polybutadiene rubber solution in styrene has to be filtered prior to the polymerization in order to remove gel particles.

Various attempts have therefore been made to prepare the necessary rubber solution in styrene directly by anionic polymerization of butadiene or butadiene/styrene in nonpolar solvents, for example cyclohexane or ethylbenzene, and subsequent addition of styrene (GB 1 013 205, EP-A-0 334 715 and U.S. Pat. No. 4,153,647) or by incomplete reaction of butadiene in styrene (EP-A 0 059 231, EP-A 0 304 088). The block rubber prepared in this way either has to be purified by precipitation or else the solvent and other volatile substances, in particular monomeric butadiene, have to be distilled off. In addition, owing to the high solution viscosity, only relatively dilute rubber solutions can be handled, which leads to high solvent, purification and energy costs.

U.S. Pat. No. 3,299,178 describes a process for polymerizing butadiene in styrene solution in the presence of a catalyst system comprising aluminum alkyls and titanium tetraiodide or titanium tetrachloride and iodine. However, a high halogen content leads to corrosion problems in the further processing of the rubber solution. The catalyst therefore has to be removed, which costs money.

WO 98/07765 and WO 98/07766 describe anionic polymerizations of butadiene in styrene. The anionic polymerization of styrene proceeds very quickly. For this reason, alkyls of alkaline earth metals, zinc and aluminum were used as retardant additives. The additives described have a retarding effect both on the polymerization of butadiene and on the polymerization of styrene. Without addition of randomizers, the anionic polymerization of a monomer mixture of styrene and butadiene initially gives a virtually pure homopolybutadiene block. To slow the subsequent styrene polymerization to a rate which can readily be controlled in industry, the additives have to be added in such amounts that the polymerization rate of butadiene is reduced too much and the overall process becomes uneconomical.

It is an object of the present invention to find a process for polymerizing dienes in a solvent comprising vinylaromatic monomers which leads to diene rubbers having a low incorporation of vinylaromatic monomers together with high butadiene conversions. The diene rubber solutions should as far as possible be able to be used directly, i.e. without removal of catalyst residues, degassing of unreacted dienes or precipitation of the diene rubber, for preparing impact-modified styrene polymers.

We have found that this object is achieved by a process for polymerizing dienes in a solvent comprising vinylaromatic monomers, wherein the polymerization is carried out in the presence of
  a) an organometallic compound of Ti, Zr, Hf, V, Nb, Ta, Cr, Mo, or W as catalyst,
  b) a Lewis acid as cocatalyst,
  c) if desired, an alkylating agent and
  d) if desired, a regulator.

The solvent preferably consists of from 85 to 100% by weight of vinylaromatic monomers and from 0 to 15% by weight of toluene, cyclohexane, methylcyclohexane, ethylbenzene or DECALIN® (decahydronaphthalene).

As catalyst, preference is given to using a metal chelate complex of Ti, Zr, Hf, V, Nb, Ta, Cr, Mo, or W having at least one chelating ligand bound via two O atoms, two N atoms or one O atom and one N atom. The chelate complex preferably has one or two chelating ligands. Preferred catalysts are metal chelate complexes of the formula (I), (II) or (III)

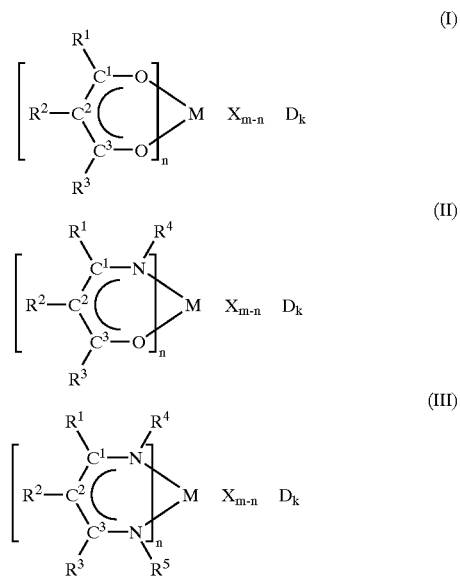

where
  $R^1$, $R^2$, $R^3$, $R^4$ and $R^5$ are, independently of one another, hydrogen, unsubstituted or halogen- or alkoxy-substituted $C_1$–$C_{20}$-alkyl, $C_7$–$C_{20}$-arylalkyl, $C_6$–$C_{22}$-aryl or alkylaryl, $C_3$–$C_{15}$-cycloalkyl or alkylcycloalkyl, $C_1$–$C_{20}$-alkoxy, $C_3$–$C_{15}$-cycloalkoxy, $C_6$–$C_{22}$-aryloxy or together with one or more of $C^1$, $C^2$, $C^3$, O and N form a monocyclic, bicyclic or heterocyclic, aliphatic or aromatic ring system having from 3 to 15 ring atoms,
  M is Ti, Zr, Hf. V, Nb, Ta, Cr. Mo, W.
  X is an anion,
  D is an uncharged donor ligand,
  n is 1, 2, 3 or 4,
  m is the valence of M,
  k is an integer or fraction in the range from 0 to 10.

$R^1$, $R_2$, and $R^3$ can be, independently of one another, hydrogen, methyl, i-propyl, t-butyl, cyclohexyl, methoxy, ethoxy, i-propoxy, t-butoxy, cyclohexoxy, phenyl, 2,6-di-tert-butylphenyl, 2,6-di-tert-butyl-4-methylphenyl, phenoxy, 2,6di-tert-butylphenoxy, 2,6-di-tert-butyl-4-methylphenoxy and $R^4$ and $R^5$ can be, independently of one another, hydrogen, methyl, i-propyl, t-butyl, cyclohexyl, phenyl, 2,6-diisopropylphenyl, 2,6-di-tert-butylphenyl, 2,6-di-tert-butyl-4-methylphenyl.

Examples of suitable anions X are unsubstituted or halogen- or alkoxy-substituted $C_1$–$C_{20}$-alkoxides, $C_3$–$C_{15}$-cycloalkoxides, $C_6$–$C_{22}$-arylalkoxides, tetraalkylsilyloxy, dialkylamide, bis(trialkylsilyl)amide, halide, sulfonates such as triflates, cyanides, substituted or unsubstituted dialkyl or diaryl phosphates having from 1 to 20 carbon atoms.

Suitable donor ligands D in the formulae (I) to (III) are, for example, tetrahydrofuran, diethyl ether, pyridine, dioxane, tetraxnethylenediamine or triethylamine.

As chelating ligands, it is possible to use, for example, 2,2,6,6-tetramethylheptane-3,5-dione, 2,2,4,6,6-pentamethylheptane-3,5-dione, 1,3-diphenylpropane-1,3-dione, 1-(4-tert-butylphenyl)-3-(4-methoxyphenyl)propane-1,3-dione, 3-phenylpentane-2,4-dione, 1,1,1-trifluoro-4-naphthylbutane-2,4-dione, 3-heptafluorobutyryl-(+) camphor, 1,1,1,2,2-pentafluoro-6,6-dimethylheptane-3,5-dione, tert-butyl salicylate, di-tert-butyl malonate, di(2,6-di-tert-butyl-4-methylphenyl)malonate in deprotonated form.

Particular preference is given to using a titanium compound as catalyst, in particular bis(2,2,6,6-tetramethyl-3,5-heptanedionato)Ti(IV) dichloride, (2,2,6,6-tetramethyl-3,5-heptanedionato)Ti(III) dichloride (THF adduct), (2,2,6,6-tetramethyl-3,5-heptanedionato)Ti(IV) triisopropoxide, (2,2,6,6-tetramethyl-3,5-heptanedionato)Ti(III) diisopropoxide (THF adduct), bis(2,2,6,6-tetramethyl-3,5-heptanedionato)Ti(IV) diisopropoxide or bis(1-(4-tert-butylphenyl)-3-(4-methoxyphenyl)-1,3-propanedionato)Ti (IV) diisopropoxide.

Particularly preferred complexes of the formula (I) are bis(2,2,6,6-tetramethyl-3,5-heptanedionato)titanium(IV) diisopropoxide and bis(2,2,6,6-tetramethylheptane-3,5-dionato)titanium(IV) dichloride.

Preference is given to using a cocatalyst which contains no ionically bound halogen. Examples of suitable cocatalysts are open-chain or cyclic aluminoxane compounds such as methylaluminoxane (MAO), boranes, preferably phenylboranes substituted by fluorine or fluoroalkyl groups, e.g. tris(pentafluorophenyl)borane, and borates such as tetrakis (pentafluorophenyl)borate of noncoordinating counterions, preferably N,N-dimethylanilinium.

If desired, the polymerization can be carried out in the presence of not only the catalyst and cocatalyst but also an alkylating agent and/or a regulator.

Alkylating agents which can be used are alkyl compounds of aluminum, magnesium or zinc bearing at least one $C_1$–$C_{20}$-alkyl group. Preference is given to using a monoalkyl, dialkyl or trialkyl compound of aluminum, for example triethylaluminum or triisobutylaluminum, as alkylating agent.

Possible regulators are hydrogen, aluminum hydrides such as dibutylaluminum hydride, olefins such as ethylene, propylene, butylene, 1-hexene or 1-octene, allyl compounds such as allylmagnesium bromide, bisallyl magnesium, phenylacetylene, trimethylvinylsilane, allyl ethers, allyl halides or allyl esters or polar comonomers such as methyl, ethyl, butyl, hexyl or glycidyl acrylates or methacrylates, vinyl acetate, vinylimidazole, vinylpyrrolidone, vinyl ethers, in particular ethyl or isobutyl vinyl ether or acetonitrile. The regulator allows the viscosity of the rubber solution to be adjusted.

The catalyst is generally used in a molar ratio of from 1;100,000 to 1:1000, based on the metal of the catalyst to the diene.

The molar ratio of catalyst to cocatalyst is generally from 1:0.5 to 1:10,000. in the case of organoaluminum compounds as cocatalyst preferably from 1:10 to 1:10,000, particularly preferably from 1:20 to 1:2000, in particular from 1:30 to 1:1000. In the case of boron compounds as cocatalyst, the molar ratio of catalyst to cocatalyst is preferably from 1:0.9 to 1:2.

If an alkylating agent is used, the molar ratio of alkylating agent to catalyst is generally from 0.3:1 to 10,000:1. The regulator is generally added in amounts which result in a molecular weight of the rubber in the range from 100,000 to 500,000 g/mol. in particular from 300,000 to 400.000 g/mol. As regards these molecular weights, the viscosities of the rubber solutions are in the industrially handleable region. The molar ratio of regulator to catalyst is generally from 0.5:1 to 10,000:1.

If an alkylating agent is used, it is preferably premixed with the catalyst and after from about 10 to 60 minutes is combined with the monomers containing the cocatalyst and any regulator used.

Preferred monomers are 1,3-butadiene, isoprene, 2,3-dimethylbutadiene, 1,3-pentadiene, 1,3-hexadiene or piperylene or mixtures thereof.

As comonomers and as "solvent" or "solvent component" in the process of the present invention, suitable vinylaromatic compounds are, for example, styrene, α-methylstyrene, p-methylstyrene, ethylstyrene, tert-butylstyrene, vinyltoluene or 1,1-diphenylethylene or mixtures thereof. Styrene is particularly preferred as "solvent" or "solvent component".

For practical reasons, a small amount of a further solvent can be used. Suitable further solvents are aliphatic, cycloaliphatic or aromatic hydrocarbons having from 4 to 12 carbon atoms, e.g. pentane, hexane, heptane, cyclohexane, methylcyclohexane, isooctane, benzene, alkylbenzenes such as toluene, xylene, ethyl benzene and DECALIN® (decahydronaphthalene) and suitable mixtures. If a further solvent is used, the amount of vinylaromatic compound as a proportion of the total amount of solvent is generally in the range from 85 to 100 percent by weight, preferably from 90 to 100 percent by weight.

The starting concentration of the diene is generally in the range from 3 to 20 percent by weight, preferably from 5 to 10 percent by weight, based on the total solution.

The polymerization of the dienes is generally carried out at from 0 to 100° C., preferably from 20 to 60° C.

After reaching the desired conversion, the polymerization can be stopped by deactivation of the catalyst using protic compounds, for example water, carboxylic acids and/or alcohols.

The process of the present invention gives polydienes having a relatively low proportion of copolymerized vinylaromatic monomers. The content of 1,2-vinyl linkages is generally in the range from 1 to 25 mol %, preferably from 2 to 10 mol %, and the content of 1,2-trans linkages is generally less than 50 mol %, so that an undesirable tendency of the product to crystallize can be avoided.

If desired, gel inhibitors such as hydrocarbon halides, silicon halides and 1,2-diolefins can also be used. The amounts used depend on the compound used in the individual case. The preferred 1,2-butadiene is generally used in amounts of from about 100 to 3000 ppm.

The diene rubber obtained by the process of the present invention can in principle be used in all processes in which use is made of rubber solutions in vinylaromatic compounds, which are usually obtained by dissolving the rubber in the vinylaromatic compound and/or additional solvents. The rubber solutions can, if desired after addition of further monomers, including ethylenically unsaturated compounds other than vinylaromatic compounds, solvents and/or initiators, be subjected directly to an anionic polymerization or a free-radical polymerization initiated thermally or by means of free radical initiators.

The rubber solutions are particularly suitable for producing molding compositions comprising vinylaromatic monomers, for example high-impact polystyrene (HIPS), acrylonitrile-butadiene-styrene polymers (ABS) and methyl methacrylate butadiene-styrene copolymers (MBS).

As monomers for forming the matrix, further ethylenically unsaturated compounds, in particular aliphatic vinyl compounds such as acrylonitrile, acrylic or methacrylic esters, for example the methyl, ethyl, ethylhexyl or cyclohexyl esters, maleic esters, maleic anhydride or maleiimide, as well as the abovementioned vinylaromatic compounds can be added to the diene rubber solution.

Suitable free radical initiators are peroxides, for example diacyl, dialkyl and diaryl peroxides, peroxyesters, peroxydicarbonates, peroxyketal, peroxosulfates, hydroperoxides or azo compounds. Preference is given to using dibenzoyl peroxide, 1,1-di-tert-butylperoxocyclohexane, dicumyl peroxide, dilauryl peroxide and azobisisobutyronitrile.

As auxiliaries, it is possible to add molecular weight regulators such as dimeric α-methylstyrene, mercaptans such as n-dodecyl mercaptan or tert-dodecyl mercaptan, chain branching agents, stabilizers or mold release agents.

The polymerization of the matrix can be carried out entirely in bulk or in solution. The polymerization is generally carried out at from 50 to 200° C., preferably from 90 to 150° C., in the case of a free-radical polymerization or in the range from 20 to 180° C., preferably from 30 to 80° C., in the case of an anionic polymerization. The reaction can be carried out isothermally or adiabatically.

The process of the present invention offers the advantage that the molding compositions can be produced in a "single-vessel reaction" without laborious changes of reaction medium. In addition, no solvent or only small amounts of solvents are required, so that their costs and the costs of purification and work-up are largely eliminated.

In a particular embodiment, the preparation of the rubber solution and the polymerization of the matrix are carried out in one continuous process. For this purpose, for example, the diene rubber required for formation of the soft phase is polymerized as described above in a first reaction zone and is passed directly to a second reaction zone. In this second reaction zone, further vinylaromatic or olefinic monomers may be added in an amount sufficient to achieve phase inversion and, if desired, further anionic or free radical initiators and, if desired, solvents may also be added and the mixture is polymerized to phase inversion. In a third reaction zone, the polymerization with that amount of vinylaromatic or olefinic monomer necessary to form the impact-modified thermoplastic molding composition is completed anionically or by a free radical mechanism.

The molding compositions obtained can be freed of solvents and residual monomers by means of degassers or vented extruders at atmospheric pressure or under reduced pressure and temperatures of from 190 to 320° C.

If the matrix of the rubber-modified molding composition is also built up by anionic polymerization, it can be advantageous to crosslink the rubber particles by appropriate temperature conditions and/or by addition of peroxides, in particular those having a high decomposition temperature, e.g. dicumyl peroxide.

EXAMPLES

Catalyst Syntheses

The synthesis of the sometimes air- and hydrolysis-sensitive catalyst complexes was carried out under an inert gas atmosphere using dried and degassed solvents.

The synthesis of the bis(β-diketonate) catalyst complexes was carried out using methods analogous to those described in Yamamoto, A., Kambara, S., J. Am. Chem. Soc. 1957, 79, 4344–4348 and Wilkie, C. A., Lin, G.; Haworth, Inorg. Synth. Vol. 19, Ed. D. Shriver, Ch. 33, 145.

A: Bis(2,2,6,6-tetramethyl-3,5-heptanedionato)Ti(IV) dichloride
B: (2,2,6,6-Tetramethyl-3,5-heptanedionato)Ti(III) dichloride (THF adduct)
C: (2,2,6,6-Tetramethyl-3,5-heptanedionato)Ti(IV) triisopropoxide
D: (2,2,6,6-Tetramethyl-3,5-heptanedionato)Ti(III) diisopropoxide (THF-adduct)
E: Bis(2,2,6,6-tetramethyl-3,5-heptanedionato)Ti(IV) diisopropoxide
F: Bis(Eusolex 9020®*)Ti(IV) diisopropoxide
G: Tris(2,2,6,6-tetramethyl-3,5-heptanedionato)Ti(III)
H: 10 μmol of 2,2,6,6-tetramethyl-3,5-heptanedione and 5 μmol of Ti(IV) tetraisopropoxide

*Eusolex 9020® is a product of Merck KgaA and is, in chemical terms, 1-(4-tert-butylphenyl)-3-(4-methoxyphenyl)-1,3-propanedione Synthesis of bis(2,2,6,6-tetramethyl-3,5-heptanedionato)titanium(IV) diisopropoxide (catalyst E)

Tetra(isopropoxy)titanium $Ti(O^iPr)_4$ (0.010 mol) together with 20 ml of dichloromethane were placed under nitrogen in a round-bottom flask. A solution of the β-diketone 2,2,6,6-tetramethyl-3,5-heptanedione (0.020 mol) in 10 ml of dichloromethane was slowly added thereto over a period of 10 minutes. The mixture was stirred for 60 minutes under a gentle stream of nitrogen, and the volatile constituents were subsequently taken off to complete dryness under reduced pressure. 10 ml of n-pentane were added twice and each time taken off to dryness under reduced pressure, giving a white, finely crystalline product. Isopropanol formed was effectively removed by the "stripping" with pentane. The conversion determined by $^1$H-NMR spectroscopy was quantitative.

The complex F was prepared by a method analogous to that for E, except that Eusolex-9020® was used as diketone.

The mono-diketonate complex C was synthesized by an analogous method. The difference from the synthesis of catalyst E was that one equivalent of ligand, based on tetra(isopropoxy)titanium, was used.

The titanium(IV) halide A was synthesized in an analogous method, using $TiCl_4$ as precursor.

The Ti(III) complexes B and D were synthesized from Ti(III)Cl$_3$.3THF and one equivalent of the β-diketone. In the case of the isopropoxide D, the halide B was treated with isopropanol.

Polymerization of Butadiene

Butadiene and toluene were dried by passage through a drying tower charged with aluminum oxide. Styrene was used in unstabilized form. Cocatalysts used were methylaluminoxane (MAO) (1.53 molar solution in toluene, from Witco), triisobutylaluminum (TIBA) (1.0 molar solution in toluene, from Witco) and triethylaluminum (TEA)(1 molar solution in hexane, from Aldrich).

Allylmagnesium bromide was used as a 1 molar solution in diethyl ether (from Aldrich). The ethylene used had a purity of 99.8%.

The handling of all organometallic compounds and the reactions were carried out under an inert gas atmosphere using dried and degassed solvents.

Examples 1 to 6

Butadiene and toluene were dried by passage through a drying tower charged with aluminum oxide. Styrene was used in unstabilized form. As cocatalyst, use was made of 1000 equivalents, in each case based on the catalyst complex A to F, of methylaluminoxane (MAO) (1.53 molar solution in toluene, from Witco).

15 µmol of the appropriate catalyst complex A to F were placed under inert gas in a glass flask provided with magnetic stirrer and a septum, and 40 ml of a solution of 2% by weight of butadiene, 5% by weight of styrene and 15 mmol of methylaluminoxane (MAO) in toluene were in each case added at 25° C. The reaction mixtures were then stirred at 25° C. for 20 hours. The polymerization was subsequently stopped by addition of 2 ml of water. The determination of the conversion and characterization of the polymers were carried out by HPLC, GPC and NMR of the organic phase.

The results of Examples 1 to 6 are shown in Table 1:

TABLE 1

| Example | Catalyst | 1,3-Butadiene conversion (%) | 1,2-Vinyl content of the PBu (mol %) | Styrene content (% by weight) | Molecular weight $M_p$ in (kg/mol) |
|---|---|---|---|---|---|
| 1 | A | 98.7 | 5.9 | 6.8 | 756 |
| 2 | B | >99 | 3.2 | n.d. | 402 |
| 3 | C | 98.0 | 3.8 | 6.6 | 668 |
| 4 | D | >99 | 2.4 | 6.6 | 525 |
| 5 | E | 93.3 | 2.9 | 8.0 | 575 |
| 6 | F | 97 | n.d. | n.d. | 376 | n.d.: not determined

Example 7

The polymerization was carried out in a 250 ml steel autoclave provided with magnetic stirrer and oil bath for regulating the temperature. Before the experiment, the steel autoclave was purged with toluene/MAO in a glove box.

In a glove box, 45 µmol of catalyst A were placed in a steel autoclave and 45 mmol of methylaluminoxane (MAO) (30 ml of a 1.5 molar toluene solution) were added. The autoclave was closed and taken from the glove box. A monomer mixture of 90 g of styrene and 10 g of butadiene was injected into the autoclave by means of nitrogen and the mixture was subsequently stirred at 25° C. for 20 hours using a magnetic stirrer.

Over a period of 15 minutes, the internal temperature increased to 36° C. and the pressure decreased from 3 to 2 bar. After 20 hours at 25° C., the autoclave was vented and the reaction mixture was deactivated using 6 ml of deionized water. The polymer solution was diluted with toluene, filtered and subsequently precipitated in ethanol. The polymer was dried overnight at 50° C. in a drying oven.

butadiene conversion: 98%
GPC (RI evaluation): $M_p$=855 kg/mol
$T_g$ (DSC): −98.9° C.
1,2-vinyl content: 3.8 mol %

Example 8

2700 g of styrene, 300 g of butadiene and 300 mmol of methylaluminoxane (1.53 molar in toluene) were placed at 25° C. in a 10 l Juvo vessel which had been boiled out with toluene and was provided with an MIK stirrer. 300 µmol of catalyst E were then added as a toluene solution under nitrogen. The internal temperature rose to 52° C. over a period of 4 minutes. After a reaction time of 2 hours, a sample (about 30 g) was taken from the homogeneous reaction mixture and admixed with 2 ml of water. To determine the solids content, part of this sample was dried at 160° C. and 0.01 mbar. The other part of the sample was purified (for NMR and GPC) by reprecipitation from toluene in ethanol and dried overnight at 50° C. in a vacuum drying oven.

solids content: 10.75%
GPC (RI evaluation): $M_p$=970 kg/mol
1,2-vinyl content of the PBu: 3.5 mol %
styrene content of the butadiene polymer: 7% by weight.

Examples 9 to 20

In each case, 15 µmol of the appropriate catalyst complex A, E or G or the starting components of the catalyst complex (H) were placed under inert gas in a glass ampoule provided with magnetic stirrer bar and septum and, after about 15 minutes at 25° C., the mixture was, if appropriate, admixed with triisobutylaluminum (TIBA) or triethylaluminum (TEA). The solutions were subsequently stirred for 20–30 minutes and then in each case admixed with 40 ml of a solution of 2% by weight of butadiene and 5% by weight of styrene in toluene (monomer mixture). The catalyst was further activated by addition of methylaluminoxane (MAO). After the reaction times shown in Table 2, the polymerization was stopped by addition of 2 ml of water. The determination of the conversion and characterization of the polymers were carried out by HPLC, GPC and NMR of the organic phase.

TABLE 2

Polymerization conditions and results for Examples 9 to 20

| Ex. | Catalyst | Cocatalyst | Molar ratio of cat:cocat:MAO | Reaction conditions | 1,3-Butadiene conversion (%) | 1,2-Vinyl content of the PBu (mol %) | Styrene content (% by weight) | $M_p$ in (kg/mol) |
|---|---|---|---|---|---|---|---|---|
| 9 | A | — | 1:—:1000 | 20 h at 25° C. | 98.7 | 5.9 | 6.8 | 756 |
| 10 | A | TEA | 1:100:1000 | 20 h at 25° C. | >99 | n.d. | n.d. | 498 |
| 11 | E | — | 1:—:1000 | 20 h at 25° C. | 98.3 | 2.9 | 8.0 | 575 |
| 12 | E | TIBA | 1:100:1000 | 20 h at 25° C. | >99 | n.d. | n.b. | 101 |
| 13 | E | TIBA | 1:50:250 | 2 h at 25° C. | 86 | 2.0 | 6.0 | 249 |
| 14 | E | TIBA | 1:100:250 | 2 h at 25° C. | 98 | n.d. | n.d. | 290 |

TABLE 2-continued

Polymerization conditions and results for Examples 9 to 20

| Ex. | Catalyst | Cocatalyst | Molar ratio of cat:cocat:MAO | Reaction conditions | 1,3-Butadiene conversion (%) | 1,2-Vinyl content of the PBu (mol %) | Styrene content (% by weight) | $M_p$ in (kg/mol) |
|---|---|---|---|---|---|---|---|---|
| 15 | E | TIBA | 1:100:250 | 4 h at 40° C. | 99 | 2.7 | 5.6 | 186 |
| 16 | G | — | 1:—:250 | 20 h at 25° C. | >99 | 2.6 | 5.4 | 581 |
| 17 | G | TIBA | 1:100:250 | 20 h at 25° C. | 83 | n.d. | n.d. | 425 |
| 18 | H | — | 1:—:250 | 4 h at 25° C. | 79 | n.d. | n.d. | 777 |
| 19 | H | TIBA | 1:100:250 | 4 h at 25° C. | >99 | 2.7 | 3.9 | 385 |
| 20 | H | TIBA | 1:100:250 | 4 h at 40° C. | >99 | 2.6 | 3.9 | 243 | n.d. not determined

Examples 21 to 30

In the Examples 21 to 28 summarized in Table 3, the procedure of Examples 9 to 20 was repeated up to the addition of the monomer mixture. However, the regulator indicated in Table 3 was additionally added before addition of methylaluminoxane. In Examples 21 to 30, the catalyst E, TIBA as cocatalyst and MAO as activator were used in a molar ratio of catalyst E:TIBA:MAO=1:100:250. The work-up of the reaction mixture and characterization of the polymers were carried out by methods analogous to Examples 9 to 20.

TABLE 3

Polymerization conditions and results for Examples 21 to 30

| Ex. | Regulator | Molar ratio of catalyst:regulator | Reaction conditions | 1,3-Butadiene conversion (%) | 1,2-Vinyl content of the PBu (mol %) | Styrene content (% by weight) | $M_p$ in (kg/mol) |
|---|---|---|---|---|---|---|---|
| 21 | — | — | 2 h at 25° C. | 98 | 2.0 | 6.0 | 290 |
| 22 | Ethylene | 1:33 | 20 h at 25° C. | 98 | n.d. | n.d. | 140 |
| 23 | Ethylene | 1:66 | 20 h at 25° C. | 98 | n.d. | n.d. | 87 |
| 24 | Ethylene | 1:66 | 4 h at 40° C. | >99 | 2.7 | 5.9 | 72 |
| 25 | Allylmagnesium bromide | 1:0.66 | 4 h at 25° C. | >99 | 2.8 | 2.8 | 96 |
| 26 | Methyl acrylate | 1:7 | 4 h at 25° C. | >99 | 2.4 | 5.6 | 240 |
| 27 | Isobutyl vinyl ether | 1:13 | 4 h at 25° C. | 94 | 3 | 2.2 | 98 |
| 28 | Cyclohexadiene | 1:13 | 4 h at 25° C. | >99 | 2.5 | 4 | 158 |
| 29 | Phenylacetylene | 1:7 | 4 h at 25° C. | >99 | n.d. | n.d. | 215 |
| 30 | Trimethylvinylsilane | 1:7 | 4 h at 25° C. | >99 | n.d. | n.d. | 73 | n.d. not determined
Catalyst: E; Cocatalyst: TIBA; molar ratio: catalyst E:TIBA:MAO = 1:100:250)

Example 31

2700 g of styrene, 300 g of butadiene and 300 mmol of methylaluminoxane (1.53 molar in toluene) were placed at 25° C. in a 10 l Juvo vessel which had been boiled out with toluene and was provided with an MIK stirrer. 300 μmol of catalyst E and 30 mmol of TIBA were then mixed by stirring for 30 minutes and added under nitrogen to the contents of the vessel. This resulted in the internal temperature rising to 52° C. over a period of 3 minutes. After a reaction time of 2 hours, a sample (about 30 g) was taken from the homogeneous reaction mixture and admixed with 2 ml of water. To determine the solids content, part of this sample was dried at 160° C. and 0.01 mbar. The other part of the sample was purified (for NMR and GPC) by reprecipitation from toluene in ethanol and dried overnight at 50° C. in a vacuum drying oven.

solids content: 9.48%
GPC (RI evaluation): $M_p$=802 kg/mol
1,2-vinyl content of the PBu: 4.1 mol %
styrene content of the butadiene polymer: 1.2% by weight

Example 32

2700 g of styrene and 75 mmol of methylaluminoxane (1.53 molar in toluene) were placed at 25° C. in a 10 l Juvo vessel which had been boiled out with toluene and was provided with an MIK stirrer. The vessel was then evacuated to about 0.09 bar and subsequently pressurized with ethylene to a pressure of 2.0 bar. After stirring the contents of the vessel for 75 minutes at room temperature. 300 g of butadiene were injected and the contents of the vessel were stirred for another 30 minutes. The catalyst was then added in the form of a premixed solution (30 min) of 300 μmol of catalyst E and 15 mmol of TIBA. This resulted in the internal temperature rising to 39° C. over a period of 20 minutes. After a reaction time of two hours, a sample (about 30 g) was taken from the homogeneous reaction mixture and admixed with 2 ml of water, and was worked up in a manner analogous to that for the sample in Example 31.

solids content: 9.0%
GPC (RI evaluation): $M_p$=285 kg/mol
1,2-vinyl content of the PBu: 4.1 mol %
styrene content of the butadiene polymer: 3.7% by weight

We claim:
1. A process for polymerizing dienes in a solvent comprising vinylaromatic monomers, which comprises carrying out the polymerization in the presence of a) an organometallic compound of Ti, Zr, Hf, V, Nb, Ta, Cr, Mo or W as catalyst,
b) and of Lewis acid as cocatalyst,
c) and, optionally, an alkylating agent, and
d) optionally, a regulator.

2. A process as set forth in claim 1, wherein the solvent is composed of from 85 to 100% by weight of vinylaromatic monomers and from 0 to 15% by weight of toluene, cyclohexane, methylcyclohexane, xylene, ethylbenzene or decahydronaphthalene.

3. A process as set forth in claim 1, wherein the catalyst used comprises an organometallic chelate complex of Ti, Zr, Hf, V, Nb, Ta, Cr, Mo or W having chelating ligands bonded via two O atoms, two N atoms, or one O and one N atom.

4. A process as set forth in claim 1, where the catalyst used comprises an organometallic chelate complex of the formula (I), (II) or (III)

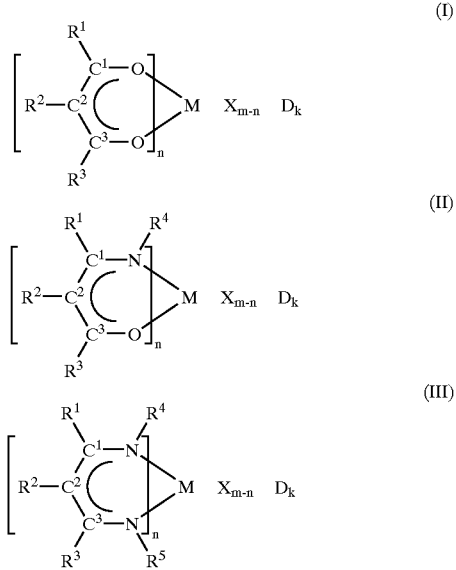

where
R$^1$, R$^2$, R$^3$, R$^4$ and R$^5$, independently of one another, are hydrogen, unsubstituted or halo- or alkoxy-substituted C$_1$–C$_{20}$-alkyl, C$_7$–C$_{20}$-arylalkyl, C$_6$–C$_{22}$-aryl or alkylaryl, C$_3$–C$_{15}$-cycloalkyl or alkylcycloalkyl, C$_1$–C$_{20}$-alkoxy, C$_3$–C$_{15}$-cycloalkoxy or C$_6$–C$_{22}$-aryloxy, or, with one or more of C$^1$, C$^2$, C$^3$, O or N, form a mono-, bi- or heterocyclic, aliphatic or aromatic ring system having from 3 to 15 ring atoms,
M is Ti, Zr, Hf, V, Nb, Ta, Cr, Mo, W,
X is an anion,
D is a neutral donor ligand,
n is 1,2,3 or 4,
m is the valency of M,
k is an integral or fractional number from 0 to 10.

5. A process as defined in claim 3, wherein the chelate complex has one or two chelating agents.

6. A process as defined in claim 1, wherein the catalyst used comprises bis(2,2,6,6-tetramethyl-3,5-heptanedionato)Ti(IV) dichloride, (2,2,6,6-tetramethyl-3,5-heptanedionato)Ti(III) dichloride (THF adduct), (2,2,6,6-tetramethyl-3,5-heptanedionato)Ti(IV) triisopropoxide, (2,2,6,6-tetramethyl-3,5-heptanedionato)Ti(III) diisopropoxide (THF adduct), bis(2,2,6,6-tetramethyl-3,5-heptanedionato)Ti(IV) diisopropoxide, bis(1-(4-tert-butylphenyl)-3-(4-methoxyphenyl)-1,3-propanedionato)Ti(IV) diisopropoxide, or tris(2,2,6,6-tetramethyl-3,5-heptanedionato)Ti(III).

7. A process as defined in claim 1, wherein the cocatalyst comprises an open-chain or cyclic aluminoxane compound, a borane or a borate.

8. A process as defined in claim 1, wherein the alkylating agent comprises an alkyl compound of aluminum, of magnesium, or of zinc, having at least one C$_1$–C$_{20}$-alkyl group.

9. A process as defined in claim 1, wherein the alkylating agent comprises a trialkylaluminum compound.

10. A process as defined in claim 1, wherein the regulator comprises an olefin, an allyl compound, or a polar comonomer.

11. A process as defined in claim 1, wherein the dienes comprise 1,3-butadiene or isoprene.

12. A process as defined in claim 1, wherein the vinylaromatic monomers comprise styrene, α-methylstyrene, p-methylstyrene, 1,1-diphenylethylene or mixtures of these.

13. A process for preparing impact-modified polystyrene, acrylonitrile-butadiene-styrene polymers or methyl methacrylate-butadiene-styrene copolymers, which comprises using a rubber solution prepared by a process as defined in claim 1.

14. A process for the continuous preparation of impact-modified thermoplastic molding compositions comprising a rubber-containing soft phase dispersed in a vinylaromatic hard matrix, which comprises
a) polymerizing dienes in a first reaction zone in a solvent comprising vinylaromatic monomers in the presence of an organometallic compound of Ti, Zr, Hf, V, Nb, Ta, Cr, Mo or W as catalyst and of a Lewis acid as cocatalyst, and, optionally an alkylating agent, and, optionally a regulator,
b) introducing the resultant diene rubber to a second reaction zone in which anionic or free-radical polymerization is carried out as far as phase inversion, optionally with addition of other vinylaromatic monomers or copolymerizable monomers in amounts sufficient for phase inversion to be reached, and
c) carrying the polymerization to completion by an anionic or free-radical route in a third reaction zone, with an amount of vinylaromatic monomer sufficient to form the impact-modified thermoplastic molding composition.

* * * * *